US010595255B2

(12) United States Patent
Maeda

(10) Patent No.: US 10,595,255 B2
(45) Date of Patent: Mar. 17, 2020

(54) WIRELESS COMMUNICATION APPARATUS, SYSTEM, AND METHOD

(71) Applicant: Renesas Electronics Corporation, Tokyo (JP)

(72) Inventor: Makoto Maeda, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/958,136

(22) Filed: Apr. 20, 2018

(65) Prior Publication Data

US 2018/0376397 A1 Dec. 27, 2018

(30) Foreign Application Priority Data

Jun. 26, 2017 (JP) ................. 2017-124143

(51) Int. Cl.
G01R 31/08 (2006.01)
H04W 36/18 (2009.01)
H04W 36/00 (2009.01)
H04W 36/36 (2009.01)
H04W 36/30 (2009.01)
H04W 76/23 (2018.01)
(Continued)

(52) U.S. Cl.
CPC .......... H04W 36/18 (2013.01); H04W 24/04 (2013.01); H04W 36/0072 (2013.01); H04W 36/0077 (2013.01); H04W 36/30 (2013.01); H04W 36/36 (2013.01); H04W 76/14 (2018.02); H04W 76/15 (2018.02); H04W 76/23 (2018.02); H04W 84/22 (2013.01); H04W 88/04 (2013.01)

(58) Field of Classification Search
USPC ....... 370/216, 217, 218, 219, 225, 229, 242, 370/252
See application file for complete search history.

(56) References Cited

U.S. PATENT DOCUMENTS

2005/0010837 A1* 1/2005 Gallagher ........... G06F 11/2005
714/100
2007/0168563 A1* 7/2007 Jha .......................... H04L 47/10
709/250
(Continued)

FOREIGN PATENT DOCUMENTS

JP 2008-283608 A 11/2008
JP 2009-027758 A 2/2009

Primary Examiner — Kwang B Yao
Assistant Examiner — Nguyen H Ngo
(74) Attorney, Agent, or Firm — McDermott Will & Emery LLP

(57) ABSTRACT

Provided are a wireless communication apparatus, a system and a method that are suitable for establishing steady communication by using a redundant configuration. The wireless communication apparatus includes a plurality of devices that transmit and receive data through a wireless network. The devices each include a control section and a decision section. The decision section in one of the devices designates a first device from among the devices as a first valid device, and designates a second device as a second valid device. The control section in the first device copies to the second device the data and coupling information for transmitting and receiving the data. When the second device is determined to valid, the control section in the second device transmits the copied data from the second device.

13 Claims, 14 Drawing Sheets

(51) Int. Cl.
  *H04W 76/14* (2018.01)
  *H04W 76/15* (2018.01)
  *H04W 84/22* (2009.01)
  *H04W 24/04* (2009.01)
  *H04W 88/04* (2009.01)

(56) References Cited

U.S. PATENT DOCUMENTS

| | | | |
|---|---|---|---|
| 2008/0285469 | A1 | 11/2008 | Toda et al. |
| 2009/0210751 | A1* | 8/2009 | Cabezas ............... G06F 11/2221 714/43 |
| 2010/0268761 | A1* | 10/2010 | Masson .................. H04L 51/10 709/203 |
| 2010/0283689 | A1* | 11/2010 | Waltho .................... H01Q 9/40 343/702 |
| 2010/0318666 | A1* | 12/2010 | Gallagher ........... G06F 11/1658 709/228 |
| 2011/0149900 | A1* | 6/2011 | Clima ...................... H04B 1/74 370/329 |
| 2014/0068103 | A1* | 3/2014 | Gyambavantha ... H04L 47/2475 709/238 |
| 2015/0163112 | A1* | 6/2015 | Ando ...................... H04L 49/25 370/242 |
| 2015/0169418 | A1* | 6/2015 | Cardona ............. G06F 11/2033 714/4.11 |
| 2016/0007401 | A1* | 1/2016 | Ida ........................ H04W 76/14 455/500 |
| 2016/0213521 | A1* | 7/2016 | Bacon ............... A61F 13/00063 |
| 2018/0041353 | A1* | 2/2018 | Lefebre ............... H04L 12/1845 |

* cited by examiner

WIRELESS COMMUNICATION APPARATUS, SYSTEM, AND METHOD

CROSS-REFERENCE TO RELATED APPLICATIONS

The disclosure of Japanese Patent Application No. 2017-124143 filed on Jun. 26, 2017 including the specification, drawings, and abstract is incorporated herein by reference in its entirety.

BACKGROUND

The present invention relates to a wireless communication apparatus, a system, and a method. For example, the present invention relates to a wireless communication apparatus, a system, and a method that are suitable for establishing steady communication by using a redundant configuration.

Due to widespread use of wireless communication apparatuses, a plurality of wireless communication apparatuses may autonomously establish coupling to form a tree or mesh wireless network. In this instance, a wireless communication apparatus coupled to an external network operates as a mission-critical wireless communication apparatus, which is important in a wireless network, and has a significant influence on communication stability.

If the mission-critical wireless communication apparatus in the wireless network becomes faulty, the mission-critical wireless communication apparatus interrupts communication so as to impair the functions of the whole wireless network. This situation is avoided by a known method in which, for example, a substitute (redundant) wireless communication apparatus is provided and used to rebuild the wireless network and restore the communication functions of the whole wireless network.

However, rebuilding the wireless network requires the use of a large amount of communication resources such as radio resources and power resources in order to permit the wireless communication apparatuses to exchange a large number of communication packets. As the radio resources and the power resources for the wireless communication apparatuses are limited, rebuilding the wireless network imposes a significant load on the wireless network and the wireless communication apparatuses. Therefore, when the mission-critical wireless communication apparatus in the wireless network becomes faulty, it is demanded that communication be maintained unaffected without rebuilding the wireless network.

Disclosed in Japanese Unexamined Patent Application Publication No. 2008-283608 is a technology in which an active interface and a standby (redundant) interface each use a unique address to transmit a diagnostic packet and monitor the status of a communication path. If the communication path coupled to the active interface becomes abnormal, the disclosed technology uses the standby interface. However, Japanese Unexamined Patent Application Publication No. 2008-283608 does not describe a method of maintaining communication unaffected in the event of a fault in a wireless communication apparatus by taking over, for example, wireless communication coupling information.

Disclosed in Japanese Unexamined Patent Application Publication No. 2009-027758 is an aggregation function that is exercised in a network relay device having a plurality of physical ports in order to bundle the physical ports and handle them as a single logical port. However, Japanese Unexamined Patent Application Publication No. 2009-027758 does not describe a method of maintaining communication unaffected in the event of a fault in a wireless communication apparatus by taking over, for example, wireless communication coupling information.

SUMMARY

As described above, a redundant wireless communication apparatus was used to rebuild a wireless network to maintain communication in the event of a fault in a wireless communication apparatus within a wireless network. However, when the wireless network was to be rebuilt, a plurality of wireless communication apparatuses used a large number of communication packets for rebuilding purposes. This limits, for example, radio resources and power resources to be allocated to data. Therefore, it was difficult to establish steady communication.

Other problems and novel features will become apparent from the following description and from the accompanying drawings.

According to an aspect of the present invention, there is provided a wireless communication apparatus including a plurality of devices that transmit and receive data through a wireless network. The devices each include a control section and a decision section. The decision section in one of the devices designates a first device from among the devices as a first valid device, and designates a second device as a second valid device. The control section in the first device copies to the second device the data and coupling information for transmitting and receiving the data. When the second device is determined to be valid, the control section in the second device transmits the copied data from the second device.

The above aspect of the present invention provides a wireless communication apparatus, a system, and a method that are suitable for establishing steady communication by using a redundant configuration.

DETAILED DESCRIPTION

Figure 1:
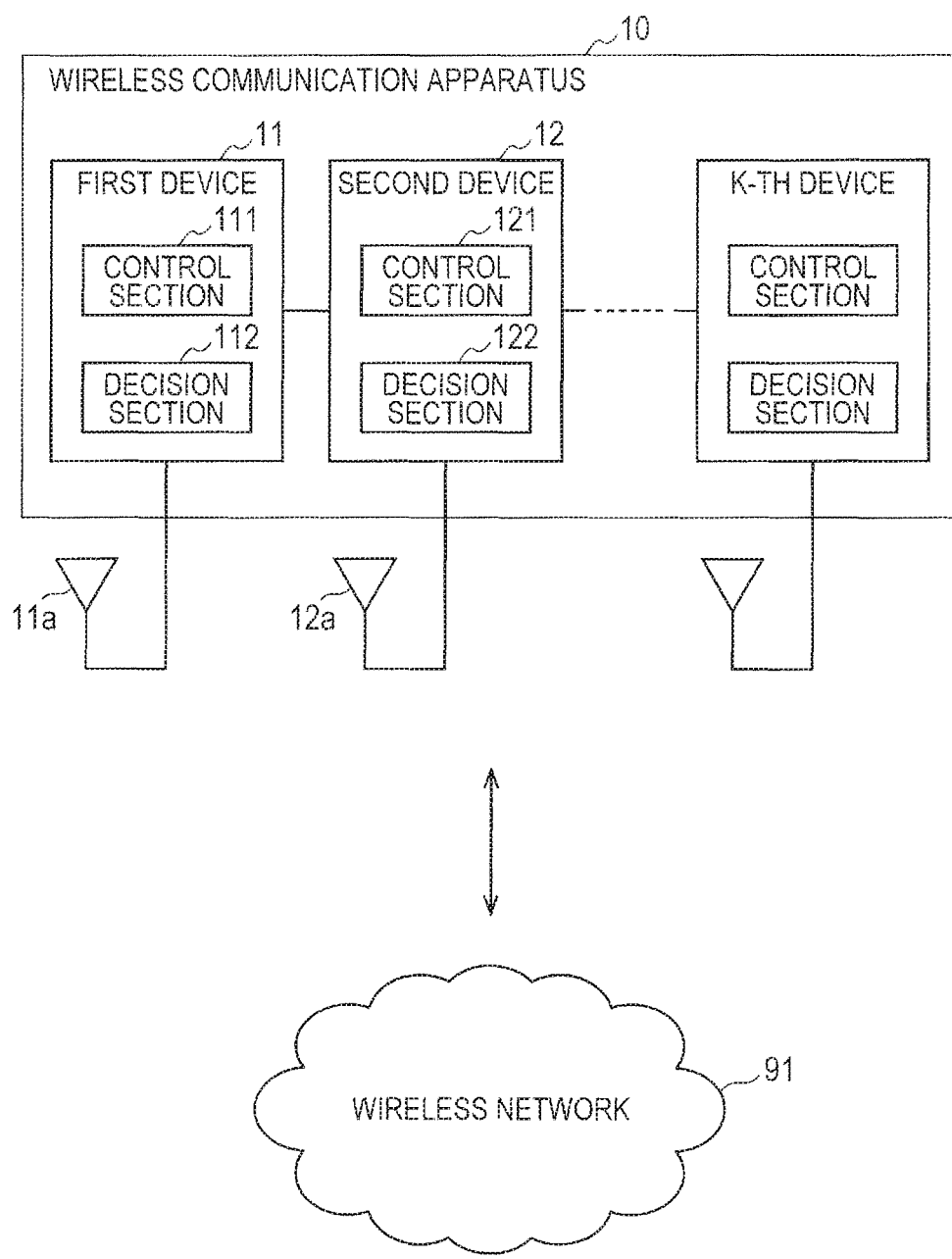
FIG. 1 is a block diagram illustrating a wireless communication apparatus according to a first embodiment of the present invention.

Embodiments to which means for solving the above problems are applied will now be described in detail with reference to the accompanying drawings. In the following description and in the drawings, omissions and simplifications are made as needed for the clarification of explanation. Further, hardware for various elements depicted in the drawings as functional blocks performing various processes can be implemented by a CPU (Central Processing Unit), a memory, or other circuit while software for such elements is implemented, for instance, by a program loaded into the memory. Therefore, it is to be understood by those skilled in the art that the functional blocks can be variously implemented by hardware only, by software only, or by a combination of hardware and software, and are not implemented restrictively by hardware alone or by software alone. Furthermore, like elements in the drawings are designated by the same reference numerals and will not be redundantly described.

Moreover, the above-mentioned program can be stored on various types of non-transitory computer readable media and supplied to a computer. The non-transitory computer readable media include various types of tangible storage media. Examples of the non-transitory computer readable media include a magnetic recording medium (e.g., flexible disk, magnetic tape, or hard disk), a magnetooptical recording medium (e.g., magnetooptical disk), a CD-ROM (Read Only Memory), a CD-R, a CD-R/W, and a semiconductor memory (e.g., mask ROM, PROM (Programmable ROM), EPROM (Erasable PROM), flash ROM, or RAM (Random Access Memory)). The program may be supplied to the computer by using various types of transitory computer readable media. Examples of the transitory computer readable media include an electrical signal, an optical signal, and an electromagnetic wave. The transitory computer readable media can supply the program to the computer through an electric wire, optical fiber, or other wired communication path or through a wireless communication path.

In the following description of embodiments, if necessary for convenience sake, a description of the present invention will be divided into a plurality of sections or embodiments, but unless specifically stated, they are not unrelated to each other, but are in such a relation that one is, for example, an exemplary modification, an exemplary application, a detailed explanation, or a supplementary explanation of a part or the whole of the other. Also, in the embodiments described below, when the number of elements (including the number of pieces, numeric values, amounts, ranges, etc.) is mentioned, the number of elements is not limited to a specific number unless, for example, specifically stated or apparently limited to a specific number in principle. The number larger or smaller than the specific number is also applicable.

Further, in the embodiments described below, their elements (including, for example, operating steps) are not always indispensable unless, for example, specifically stated or apparently indispensable in principle. Similarly, in the embodiments described below, when, for example, the shapes of the elements and the positional relationship therebetween are mentioned, for example, the substantially approximate or similar shapes are included therein unless, for example, they are specifically stated or can be apparently excluded in principle. The same goes for the aforementioned number of elements (including the number of pieces, numeric values, amounts, ranges, etc.).

First Embodiment

First of all, a wireless communication apparatus according to a first embodiment of the present invention will be outlined.

FIG. 1 is a block diagram illustrating the wireless communication apparatus according to the first embodiment.

As illustrated in FIG. 1, the wireless communication apparatus 10 according to the first embodiment includes a plurality of (k) devices that transmit and receive data through a wireless network 91. It should be noted that k is a natural number. The devices each include a control section and a decision section. More specifically, it is assumed that the first device 11 includes a control section 111 and a decision section 112, and that the second device 12 includes a control section 121 and a decision section 122. The control sections control the devices.

Only one of the devices included in the wireless communication apparatus 10 is supposed to transmit and receive data to and from another wireless communication apparatus through the wireless network 91 at a particular time point. Accordingly, the decision section in one of the devices designates the first device 11 from among the devices as a first valid device, and designates the second device 12 as a second valid device. For example, the decision section 112 in the first device 11 designates the local device (first device 11) from among the devices as a first valid device, and designates the second device 12 as a second valid device.

Based on priorities assigned to the devices, the decision section designates a first valid device (first device 11) and a second valid device (second device 12). More specifically, the decision section designates a highest priority device from among the devices as the first device 11, and designates a second highest priority device as the second device 12. The priorities may be set, for example, by writing predefined priorities in middleware. Alternatively, the priorities may be set by providing each device with a terminal (not shown) that outputs a local device activation signal, and allowing each device to determine the status of the terminal. More specifically, the decision section may locate a device that outputted an activation signal at the earliest time point and designate that device as the first device, and locate a device that outputted an activation signal at the second earliest time point and designate that device as the second device.

When the first valid device and the second valid device are designated based on the predefined priorities, it is possible to designate a desired device as a first valid device and designate another desired device as a second valid device.

For example, reception levels of the wireless communication apparatus may be used as the priorities. More specifically, it may be assumed that the higher the reception level, the higher the priority, and that the lower the reception level, the lower the priority. This ensures that a device having a relatively high reception level and a favorable radio environment is designated as the next valid device. Consequently, steady communication can be maintained when a currently used device is taken over by the next valid device.

The first device 11, which is designated as a valid device, currently operates as a valid device. The second device 12, which is designated as the next valid device, later operates as a valid device. Only one device operates at a particular time point. Therefore, the second device 12 does not operate at the present time. When the second device 12 becomes valid and operates, the first device 11 does not operate.

The control section 111 in the first device 11 copies to the second device 12 data and coupling information for transmitting and receiving the data. When validated, the first device 11 locates the second device 12, which is the next valid device, from among the devices, and copies the data and the coupling information to the second device 12. When the second device 12 is determined to be valid, the control section 121 in the second device 12 transmits the copied data from the second device 12.

The coupling information is used for data transmission and reception. The coupling information includes, for example, at least one of the identification number of the first device 11, a radio frequency used for data transmission and reception, data transmission power, a data rate, a modulation method, a spreading code, the identification number of a remote wireless communication apparatus engaged in data transmission and reception, an encryption key, a session ID (IDentification), a network ID, transmission/reception data, a transmission/reception time point, a routing destination, a sequence number, and a communication protocol type. Consequently, data can be transmitted from the second device 12 by using the same coupling information or based on the coupling information. When the first device 11 is to be taken over by the second device 12, the second device 12 takes over the coupling information used for communication by the first device 11, such as the radio frequency, the modulation method, the encryption key, and the session ID, and does not need to resume communication with new coupling information. Therefore, the second device 12 promptly takes over the first device 11 to maintain communication.

When the second device 12 is determined to be valid, the control section 121 in the second device 12 may transmit copied data from the second device 12 by using the radio frequency including in the coupling information copied to the second device 12. More specifically, the control section 121 may transmit data from the second device 12 by using the same radio frequency as that is used by the first device 11 for data transmission and reception.

The identification number of the first device 11 is, for example, a MAC (Media Access Control) address, an IP (Internet Protocol) address, or a number that is unique to the wireless communication apparatus 10 and capable of identifying the wireless communication apparatus 10 in the wireless network 91.

As the identification number of the second device 12, a number identical with the identification number of the first device 11, which is included in the coupling information. This ensures that the identification number of the first device 11 is the same as the identification number of the second device 12. Therefore, it is not necessary to set a new identification number. This eliminates the necessity of exchanging packets for new identification number setup, and thus results in an increase in data rate.

The data is transmitted from the second device 12 by using the same radio frequency as that is included in the coupling information. Therefore, it is not necessary to set a new different radio frequency when the data is to be transmitted from the second device 12. This eliminates the necessity of exchanging packets for new radio frequency setup, and thus results in an increase in data rate.

The data is transmitted from the second device 12 by using the same transmission power as that is included in the coupling information. Therefore, it is not necessary to set a new transmission power value when the data is to be transmitted from the second device 12. This eliminates the necessity of exchanging packets for new transmission power value setup, and thus results in an increase in data rate.

A device that becomes valid and operates at a particular time point is referred to as an active device, and a device that is not operating is referred to as a redundant device. Further, such a device may be referred to as a wireless communication device.

As described above, a plurality of devices, such as the first device 11 serving as an active device and the second device 12 serving as a redundant device, are mounted in a single wireless communication apparatus 10 to provide redundancy in order to maintain steady communication.

A configuration of the wireless network according to the first embodiment will now be described.

Figure 2:
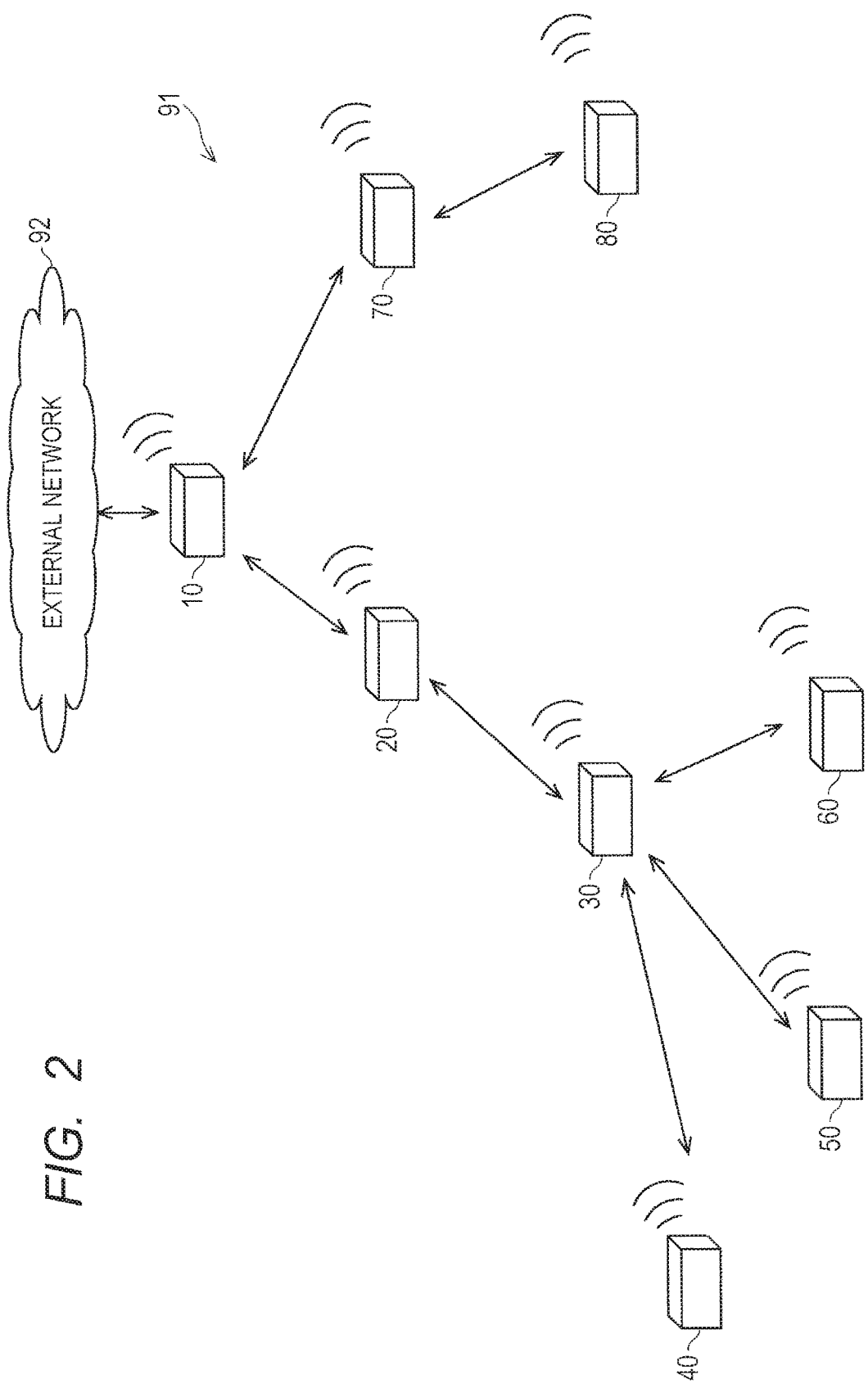
FIG. 2 is a block diagram illustrating a configuration of a wireless network according to the first embodiment.

FIG. 2 is a block diagram illustrating the wireless network according to the first embodiment.

As illustrated in FIG. 2, the wireless network according to the first embodiment is formed of wirelessly coupled wireless communication apparatuses 10-80. The wireless communication apparatus 10 can be coupled to an external network 92 to communicate with it. The external network 92 is different from the wireless network to which the wireless communication apparatus 10 belongs.

The wireless communication apparatuses 10-80 each wirelessly communicate with another wireless communication apparatus. For example, the wireless communication apparatus 10 wirelessly communicates with the wireless communication apparatus 20 and with the wireless communication apparatus 70.

The wireless network 91 illustrated in FIG. 2 is a tree wireless network. If the wireless communication apparatus 10 disposed at the starting point of such a tree wireless network 91 becomes faulty, data will not be conveyed to the wireless communication apparatuses 20-80. If the wireless communication apparatus 20 becomes faulty, data will not be conveyed to the wireless communication apparatuses 30-60. If the wireless communication apparatus 70 becomes faulty, data will not be conveyed to the wireless communication apparatus 80. The number of wireless communication apparatuses capable of receiving the data increases with a decrease in the distance between the wireless communication apparatus 10 and a faulty wireless communication apparatus. Therefore, the nearer the wireless communication apparatus 10 disposed at the starting point of the wireless network 91, the higher the importance of a wireless communication apparatus in the wireless network 91.

As described above, significant influence is exerted when the wireless communication apparatus 10 at the starting point and the wireless communication apparatuses 20, 30 near the wireless communication apparatus 10 become faulty to adversely affect wireless communication.

Consequently, the first embodiment applies a redundant configuration, for example, to the wireless communication apparatuses, 10, 20, 30 that exert significant influence when they fail to establish wireless communication. This ensures that wireless communication is steadily established in the wireless network 91.

A wireless communication apparatus having a redundant configuration is referred to as a mission-critical wireless communication apparatus. The mission-critical wireless communication apparatus includes a plurality of devices to have a redundant configuration. The wireless communication apparatus 10 is a mission-critical wireless communication apparatus because it includes a plurality of (k) devices.

A wireless communication apparatus having only one device and no redundant configuration is referred to as a simple wireless communication apparatus. A system includes a mission-critical wireless communication apparatus having a plurality of devices and a simple wireless communication apparatus having only one device.

The simple wireless communication apparatus includes a device that transmits and receives data through the wireless network 91. The device includes a simple antenna for transmitting and receiving data and a simple control section for controlling the device.

The redundant configuration according to the first embodiment need not be restrictively applied to the mission-critical wireless communication apparatuses, such as the wireless communication apparatus 10 at the starting point of the wireless network 91 and the wireless communication apparatuses 20, 30 near the starting point. The redundant configuration according to the first embodiment may be additionally applied to the wireless communication apparatuses 40, 50, 60, which are disposed far from the starting point of the wireless network 91.

A fault in the wireless communication apparatus 30 exerts a greater influence than a fault in the wireless communication apparatus 70. That is to say, the larger the number of remote wireless communication apparatuses coupled to a local wireless communication apparatus, the greater the influence exerted in the event of a fault in the local wireless communication apparatus. Therefore, the redundant configuration according to the first embodiment may be applied to a wireless communication apparatus that is coupled to a large number of remote wireless communication apparatuses.

The wireless communication apparatus according to the first embodiment will now be described in detail.

Figure 3:
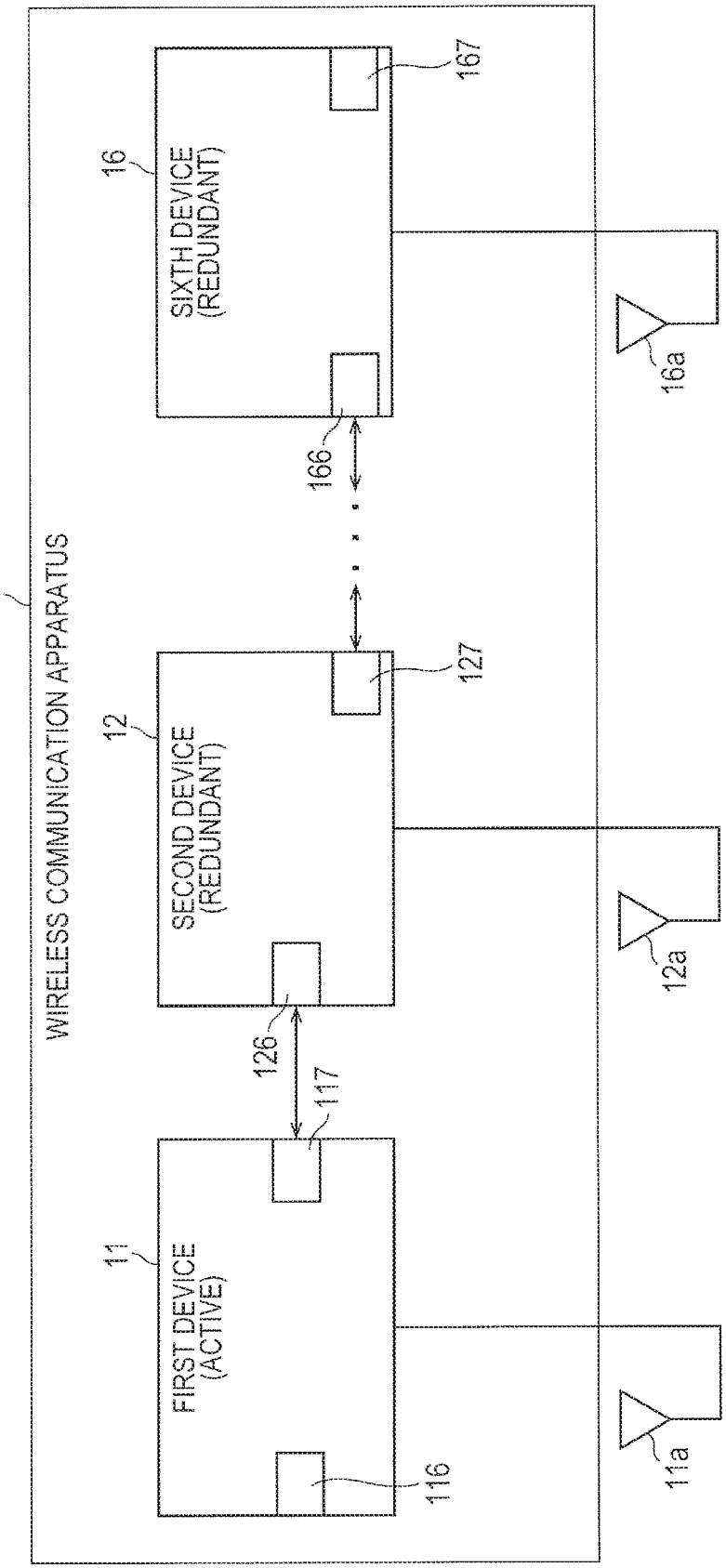
FIG. 3 is a block diagram illustrating the wireless communication apparatus according to the first embodiment.

FIG. 3 is a block diagram illustrating the wireless communication apparatus according to the first embodiment. For the sake of simplicity of explanation, the control section and the decision section are omitted from FIG. 3.

As illustrated in FIG. 3, the wireless communication apparatus 10 according to the first embodiment includes a plurality of devices to establish communication. More specifically, the wireless communication apparatus 10 includes the first device 11 and the second to sixth device 12-16. Here, it is assumed that the first device 11 is an active device, and that the second to sixth devices 12-16 are redundant devices.

The devices each include an antenna for data transmission and reception. More specifically, the first device 11 includes an antenna 11a, the second device 12 includes an antenna 12a, and the sixth device 16 includes an antenna 16a. Data is transmitted and received to and from remote wireless communication apparatuses through the antennas.

The devices are coupled through a wired interface. The devices are coupled to each other by wired communication. More specifically, the first device 11 and the second device 12 are coupled by wired communication through a wired interface 117 and a wired interface 126.

The control section 111 in the first device 11 copies data and coupling information to the second device 12 through the wired interface 117 and the wired interface 126. As coupling is achieved by wired communication, the data and the coupling information can be copied more surely than wireless communication.

In the wireless communication apparatus 10, the coupling information about the first device 11, which is an active device, is completely copied from the first device 11 to the redundant second to sixth devices 12-16 through the wired interfaces. That is to say, the coupling information including the session ID of the active device is entirely copied. Therefore, if the active device fails to maintain wireless communication for some reason, the redundant devices are able to take over the entire coupling information and resume the wireless communication.

The first embodiment is capable of providing a wireless communication apparatus, a system, and a method that are suitable for establishing steady communication by using a redundant configuration.

Further, when highly important wireless communication apparatuses in the wireless network 91 are multiplexed so as to include an active device and a redundant device, the reliability of the wireless network can be improved. That is to say, it is possible to improve the communication stabilities of the wireless communication apparatuses and the wireless network to which the wireless communication apparatuses belong.

Furthermore, the coupling information (internal status) including the MAC address of an active device is copied (mirrored) beforehand to a redundant device. Therefore, if necessary for some reason, a changeover can be seamlessly made from an active device to a redundant device.

An employed wired interface such as the wired interface 117 and the wired interface 126 may include one of a UART (Universal Asynchronous Receiver/Transmitter), a USART (Universal Synchronous/Asynchronous Receiver/Transmitter), a USB (Universal Serial Bus), an I2C (Inter-Integrated Circuit), an SPI (Serial Peripheral Interface), and Ethernet (registered trademark).

Wired interfaces such as the UART, USART, USB, I2C, SPI, and Ethernet (registered trademark) are widely used interfaces. Therefore, using these interfaces entails lower cost than using an interface produced according to unique specifications.

Meanwhile, FIG. 3 indicates that the wireless communication apparatus 10 includes six devices. However, the number of devices is not limited to six. The number of devices to be included in the wireless communication apparatus 10 may be other than six.

Figure 4:
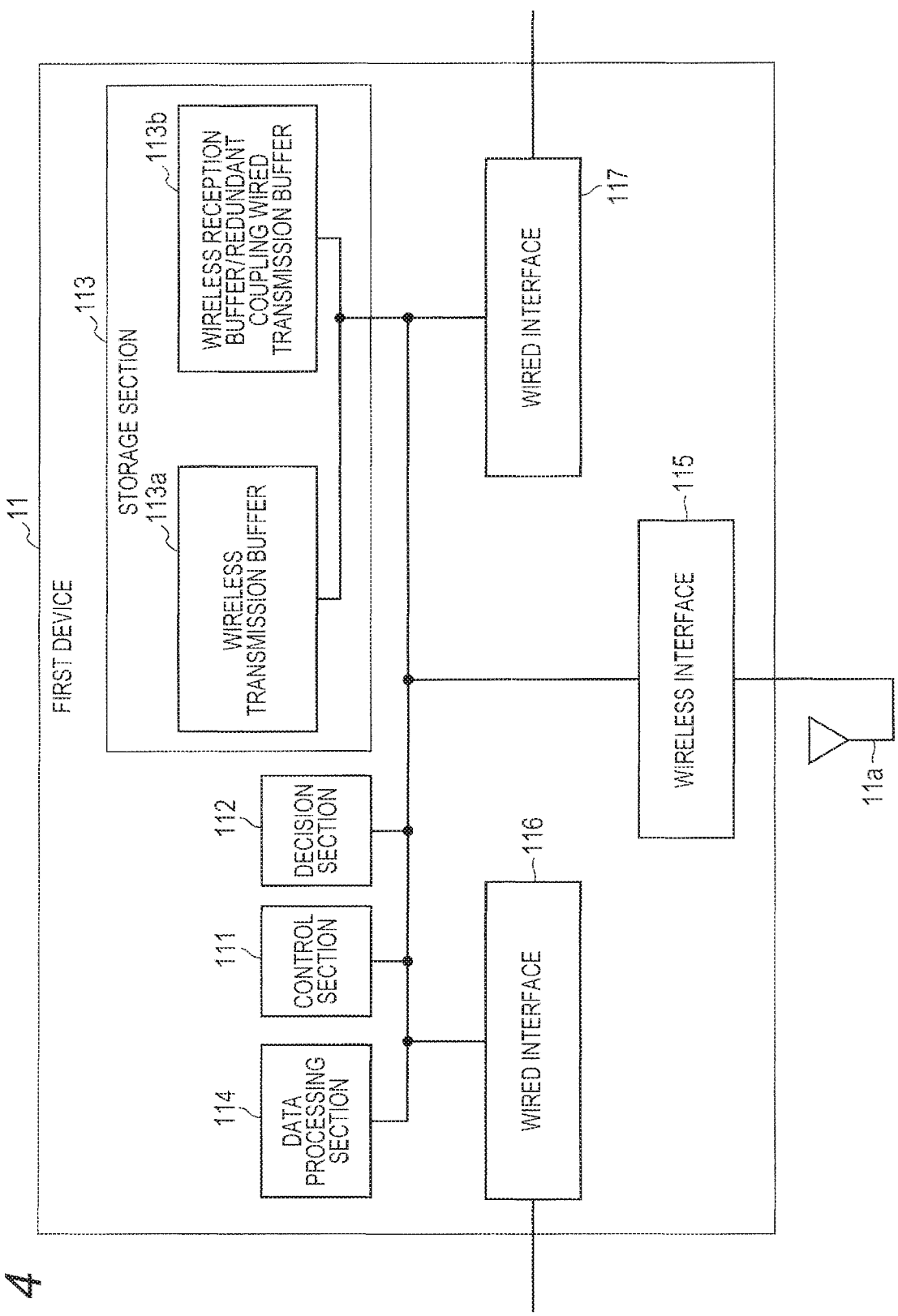
FIG. 4 is a block diagram illustrating a device according to the first embodiment.

FIG. 4 is a block diagram illustrating a device according to the first embodiment.

The device (first device 11) illustrated in FIG. 4 may be implemented either by hardware or by software.

As illustrated in FIG. 4, the first device 11 includes a wireless interface 115, a data processing section 114, and a storage section 113 in addition to the control section 111, the decision section 112, the wired interface 116, and the wired interface 117. The storage section 113 in the first device 11 includes a wireless transmission buffer 113a and a wireless reception buffer/redundant coupling wired transmission buffer 113b. The data processing section 114 modulates data into the form of outgoing data and demodulates received data. The wireless interface 115 converts data into the form of wireless communication data. The storage section may be referred to as the information storage section.

Figure 5:
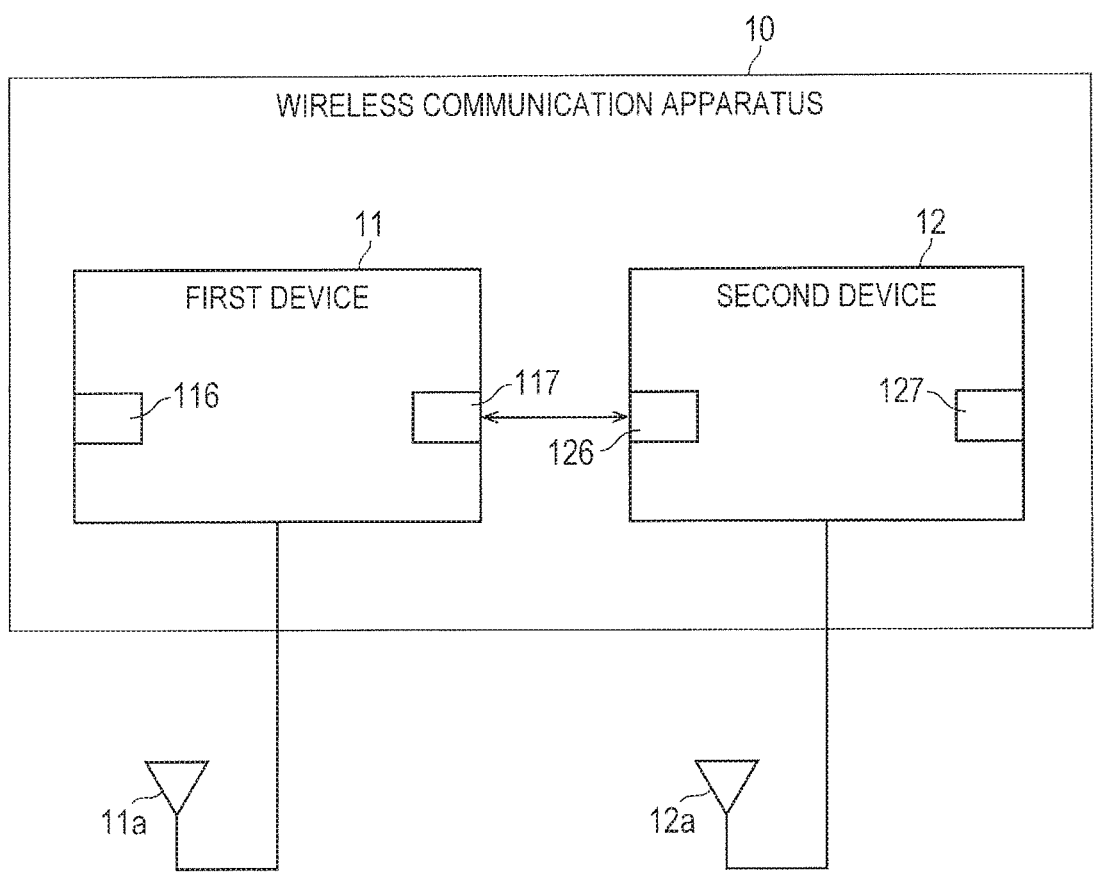
FIG. 5 is a block diagram illustrating the wireless communication apparatus according to the first embodiment.

FIG. 5 is a block diagram illustrating the wireless communication apparatus according to the first embodiment. FIG. 5 illustrates a case where two devices (first device 11 and second device 12) are disposed in the wireless communication apparatus 10. The second device 12 has the same configuration as the first device 11.

As illustrated in FIG. 5, the first device 11 includes the wired interface 116 and the wired interface 117. The second device 12 includes the wired interface 126 and the wired interface 127.

The wireless communication apparatus 10 designates a first valid device from among the devices in the wireless communication apparatus 10 as the first device 11, and designates a next valid device as the second device 12. The first device 11, which is designated as the first valid device, copies data and coupling information to the second device 12, which is designated as the next valid device, through the wired interface 117 and the wired interface 126.

Consequently, the second device is able to transmit the data by using the same coupling information.

The devices in the wireless communication apparatus 10, including the first device 11, may each have a detection section (not shown) that detects, for example, a reception power level Rx received from a wireless communication partner and the status of a device.

If the reception power level Rx detected by the detection section in the first device 11 is not higher than a predetermined level Rh, the decision section 112 determines the second device 12 to be valid.

Consequently, if the reception power level Rx is lowered due to a fault in the first device 11, the second device 12 is determined to be valid and used for communication. Therefore, communication can be maintained.

Further, if the reception power level Rx of the first device 11 is lowered due, for instance, to the influence of radio environment, the second device 12 is determined to be valid and used for communication. Subsequently, if the reception power level Rx of the second device 12 is lowered due to the influence of radio environment, another device is determined to be valid and used for communication. In this manner, communication can be maintained by switching from a device having a low reception power level Rx to another device. Therefore, it is possible to perform an antenna diversity operation based on the reception power level Rx.

At any time point without regard to the aforementioned time point of a fault or the time point of antenna diversity operation, the decision section may determine a device to be valid Furthermore, the results of detection by the detection section, such as the reception power level Rx and the status of a device, are copied from a valid device to a next valid device by a wired interface or other means.

As is the case with the first device, the other devices in the wireless communication apparatus 10 each include the storage section. The storage section stores data and coupling information. Therefore, the devices do not need to acquire the data and the coupling information from the outside.

Figure 6:
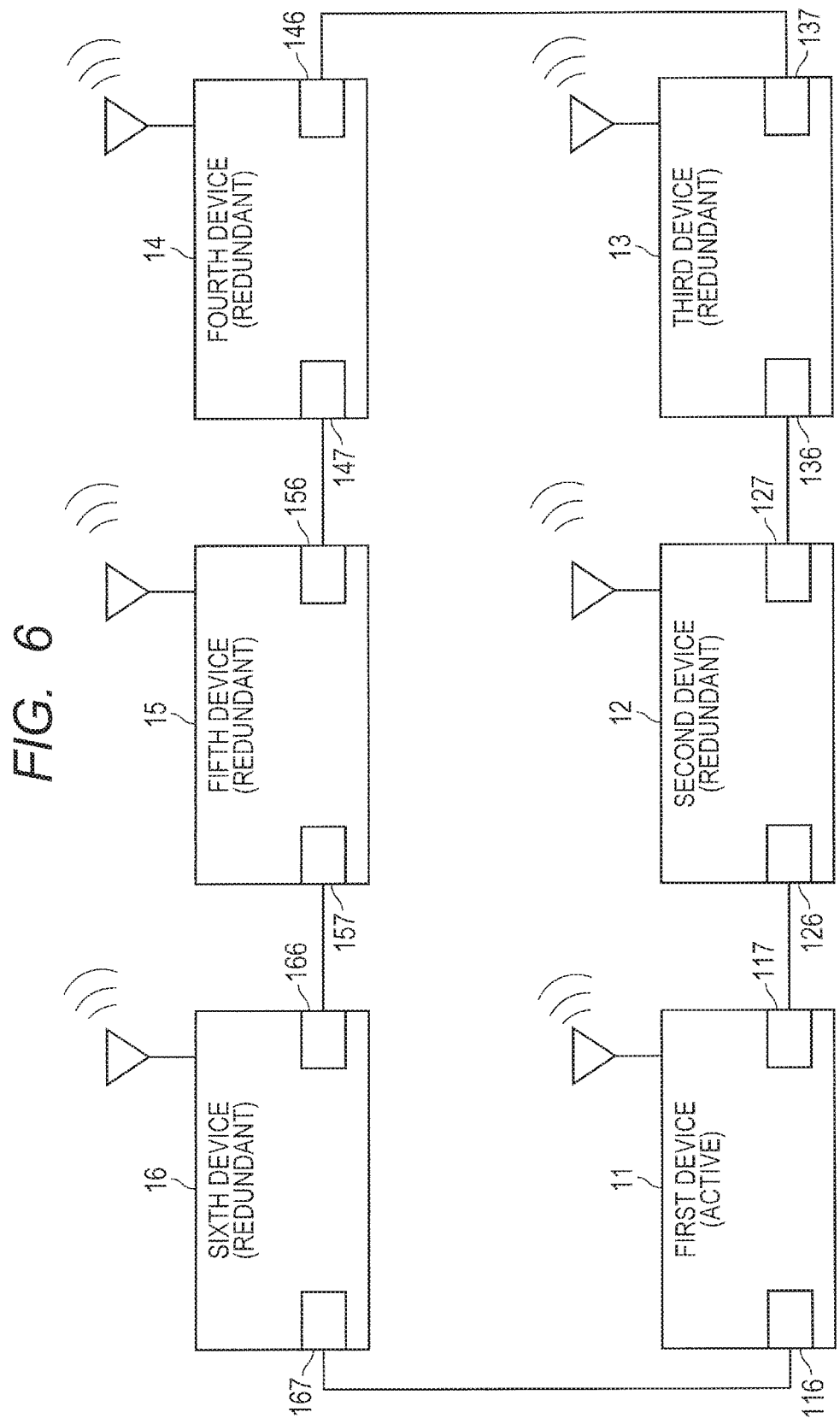
FIG. 6 is a block diagram illustrating the wireless communication apparatus according to the first embodiment.

FIG. 6 is a block diagram illustrating the wireless communication apparatus according to the first embodiment. FIG. 6 illustrates a case where six devices are disposed in the wireless communication apparatus 10.

As illustrated in FIG. 6, the devices are serially coupled through wired interfaces. That is to say, the devices are serially coupled by using the wired interfaces. When the first device 11 is an active device and the second to sixth devices 12-16 are redundant devices, the coupling information about the first device 11 is conveyed to the second to sixth devices 12-16 through the wired interfaces.

Consequently, even when the wireless communication apparatus 10 includes the first to sixth devices 11-16, data can be transmitted from the redundant devices by using the same coupling information.

Figure 7:
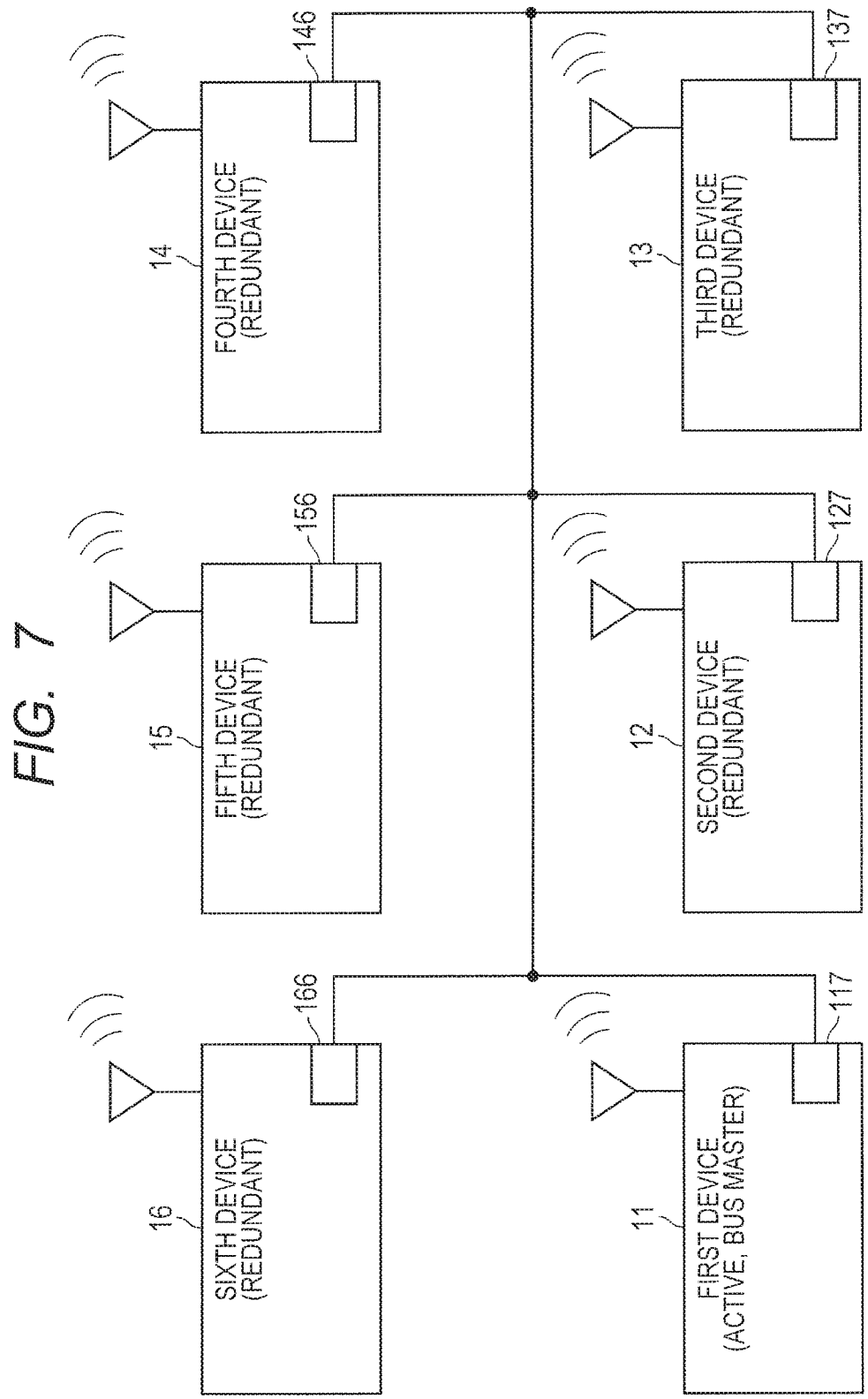
FIG. 7 is a block diagram illustrating the wireless communication apparatus according to the first embodiment.

FIG. 7 is a block diagram illustrating the wireless communication apparatus according to the first embodiment. FIG. 7 illustrates a case where six devices are disposed in the wireless communication apparatus 10.

As illustrated in FIG. 7, the devices are coupled in bus form through wired interfaces. The individual devices are bus-coupled by using the wired interfaces. When the first device 11 is an active device and the second to sixth devices 12-16 are redundant devices, the first device 11 acts as a bus master, and each of the second to sixth devices 12-16 acts as a slave. The coupling information about the first device 11 is conveyed to the second to sixth devices 12-16 through the wired interfaces. Therefore, data can be transmitted from the redundant devices by using the same coupling information.

Operations of the wireless communication apparatus according to the first embodiment will now be described.

The following description is given on the assumption that priorities are assigned to the devices in the wireless communication apparatus 10. For ease of explanation, it is assumed that the first device 11 has the highest priority, and that the second device 12 has the second highest priority, and further that the third device 13 has the third highest priority. It is also assumed that the first device 11 is an active device, and that the other devices, namely, the second and third devices 12, 13, are redundant devices.

Figure 8A:
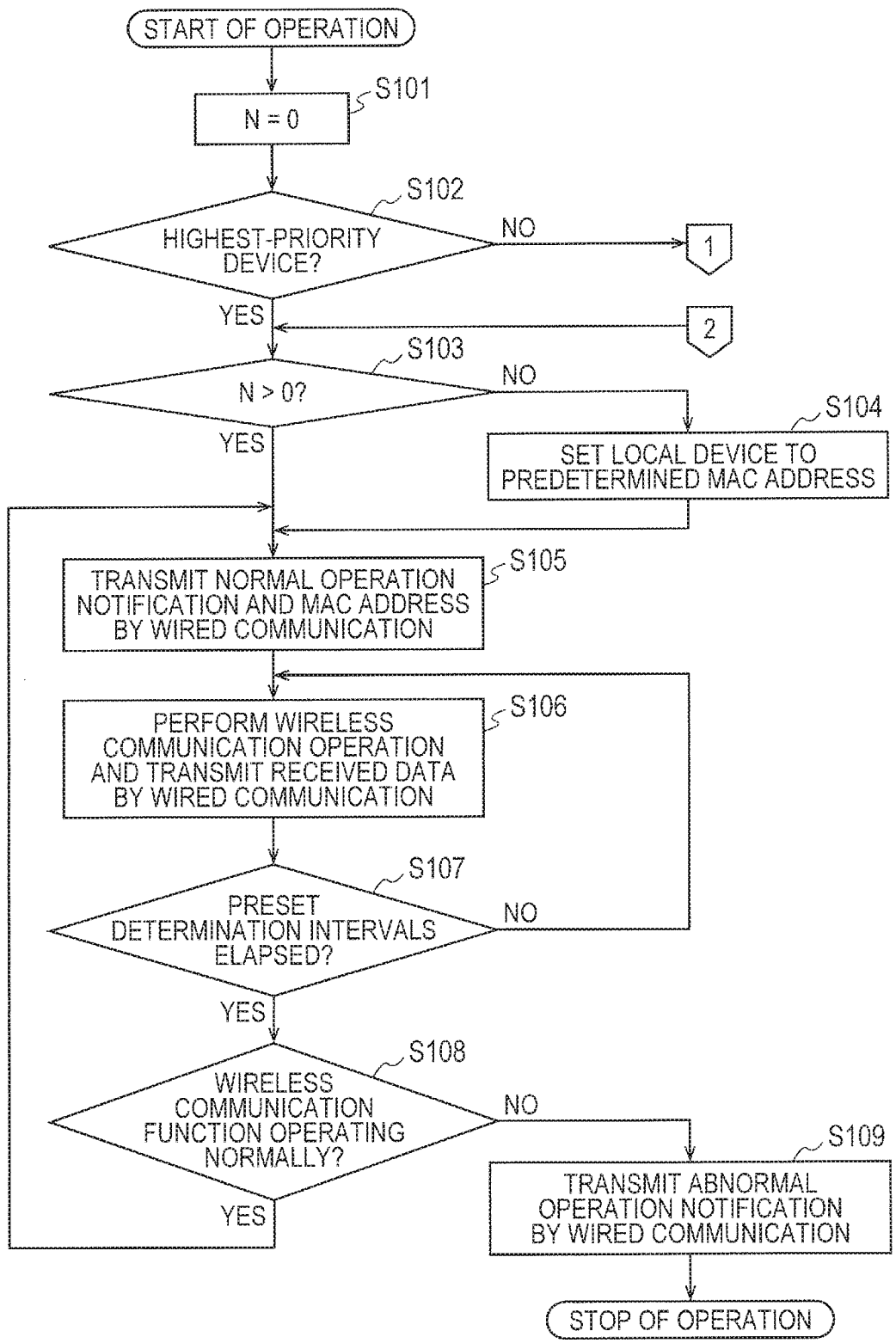
FIG. 8A is a flowchart illustrating operations of the wireless communication apparatus according to the first embodiment.

FIG. 8A is a flowchart illustrating operations of the wireless communication apparatus according to the first embodiment.

Figure 8B:
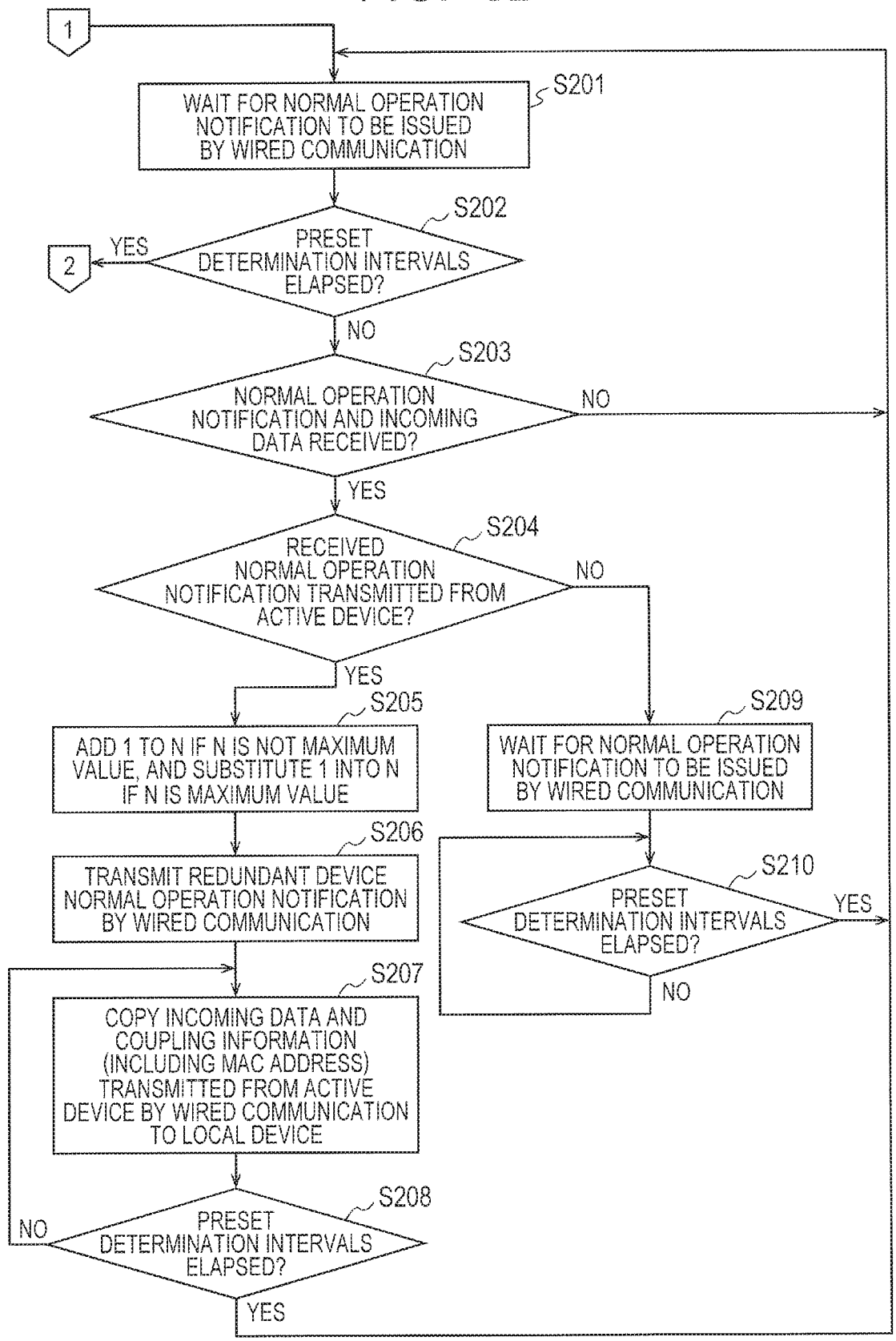
FIG. 8B is a flowchart illustrating the operations of the wireless communication apparatus according to the first embodiment.

FIG. 8B is a flowchart illustrating operations of the wireless communication apparatus according to the first embodiment.

Figure 9:
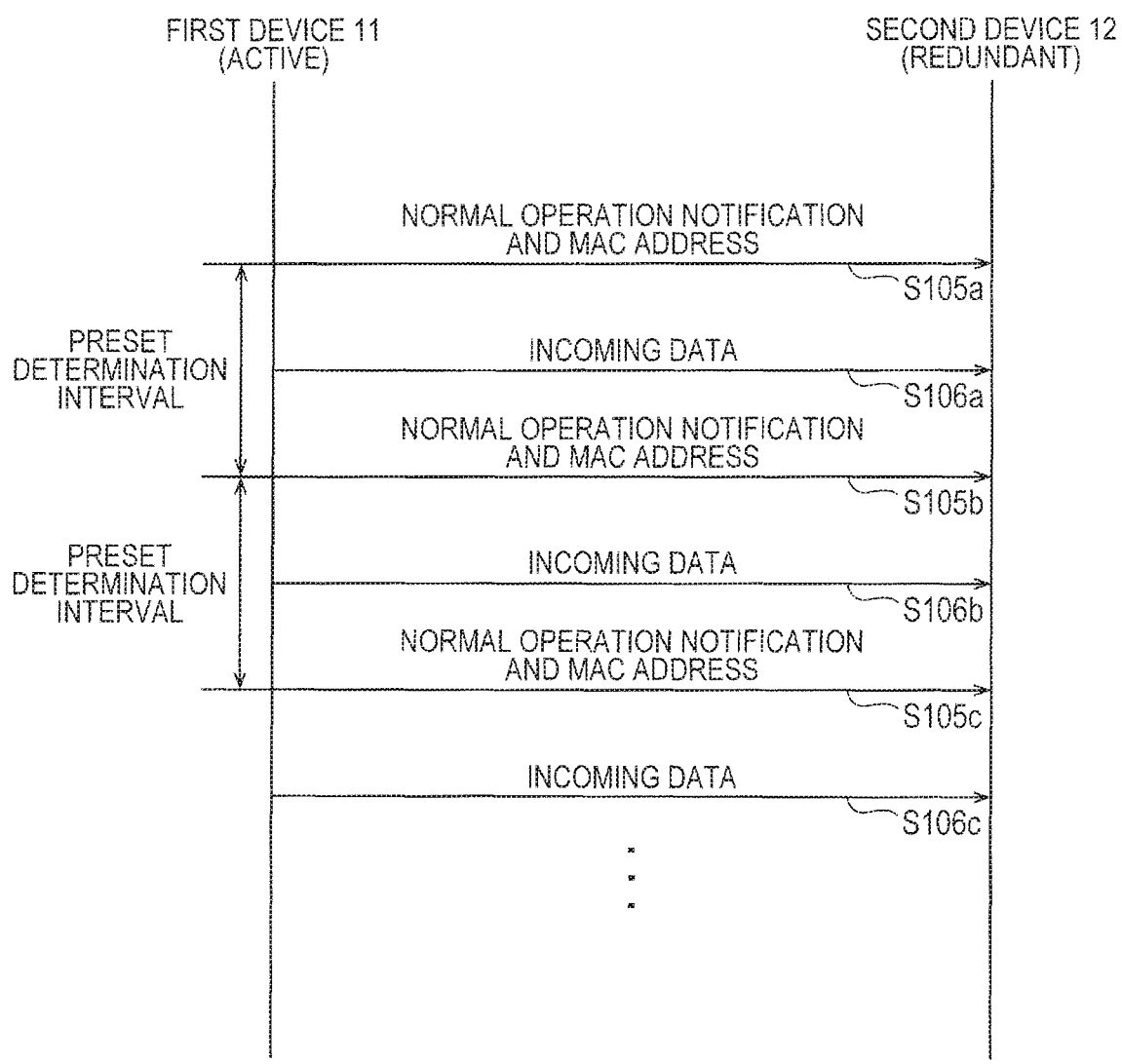
FIG. 9 is a sequence diagram illustrating the operations of the wireless communication apparatus according to the first embodiment.

FIG. 9 is a sequence diagram illustrating the operations of the wireless communication apparatus according to the first embodiment. The sequence diagram of FIG. 9 relates to normal operations.

Operations of the first device 11, which operates as an active device, will now be described.

As illustrated in FIG. 8A, the first device 11 sets a variable N to 0 (step S101).

Next, the first device 11 verifies whether it is the highest-priority device (step S102). More specifically, the first device 11 verifies whether the highest priority value is assigned to it. If the highest priority value is assigned to the first device 11, the first device 11 recognizes itself as the highest-priority device.

If the first device 11 is the highest-priority device ("YES" at step S102), the first device 11 verifies whether the variable N is greater than 0 (step S103).

If the variable N is not greater than 0 ("NO" at step S103), the first device 11 sets itself to a predetermined MAC address (step S104). Upon completion of step S104, processing proceeds to later-described step S105.

If the variable N is greater than 0 ("YES" at step S103), the first device 11 issues a normal operation notification to indicate that the first device 11 is operating normally, and transmits the MAC address set for itself to the other devices by wired communication (step S105). In step S105, the coupling information including the MAC address may be transmitted to the other devices.

The MAC address set for a local device may be referred to as the local MAC address. The wired communication is established through the wired interface 117, the wired interface 126, the wired interface 127, and the wired interface 166, which are shown in FIG. 3. The other devices correspond to a plurality of devices including the second device 12 and the sixth device 16, which are shown in FIG. 3.

After completion of step S105, the first device 11 performs a wireless communication operation to receive incoming data and transmits the received incoming data to the other devices by wired communication (step S106).

In step S105, as illustrated in FIG. 9, the first device 11 transmits the normal operation notification and the MAC address to the other devices at preset determination intervals (steps S105a, S105b, and S105c). In step S106, the first device 11 transmits the received data to the other devices at preset determination intervals (steps S106a, S106b, and S106c).

Returning to FIG. 8A, after completion of step S106, the first device 11 verifies whether the received data transmission intervals have elapsed to match the preset determination intervals (step S107).

If the received data transmission intervals have not elapsed to match the preset determination intervals ("NO" at step S107), the first device 11 returns to step S106.

If the received data transmission intervals have elapsed to match the preset determination intervals ("YES" at step S107), the first device 11 verifies whether its wireless communication function is operating normally (step S108).

If the wireless communication function of the first device 11 is operating normally ("YES" at step S108), the first device 11 returns to step S105.

If the wireless communication function of the first device 11 is not operating normally ("NO" at step S108), the first device 11 transmits an abnormal operation notification, which is a signal indicating that the first device 11 is not operating normally, to the other devices by wired communication (step S109). Subsequently, the first device 11 stops operating.

Operations of the second device 12, which operates as a redundant device, will now be described.

As illustrated in FIG. 8B, the second device 12 waits for the normal operation notification, which is issued from the first device 11 (active device), at preset determination intervals (step S201).

The second device 12 verifies whether the normal operation notification reception intervals have elapsed to match the preset determination intervals (step S202). If the normal operation notification reception intervals have elapsed to match the preset determination intervals ("YES" at step S202), the second device 12 returns to step S103.

If the normal operation notification reception intervals have not elapsed to match the preset determination intervals ("NO" at step S202), the second device 12 verifies whether the normal operation notification and incoming data transmitted from the first device 11 (active device) are received (step S203). If the normal operation notification and the incoming data are not received ("NO" at step S203), the second device 12 returns to step S201.

If the normal operation notification and the incoming data are received ("YES" at step S203), the second device 12 verifies whether the received normal operation notification is transmitted from the active device (step S204).

In a situation where the received normal operation notification is transmitted from the active device ("YES" at step S204), the second device 12 adds 1 to the variable N if the variable N is not a maximum value Nmax, or substitutes 1 into the variable N if the variable N is the maximum value Nmax (step S205). The variable N is varied from 1 to the maximum value Nmax in order to let a plurality of redundant devices perform steps S201 to S210.

After completion of step S205, the second device 12 (redundant device) transmits a redundant device normal operation notification, which indicates that the second device 12 is operating normally, to the other devices by wired communication (step S206).

The second device 12 copies to itself the incoming data and the coupling information including the MAC address, which are transmitted from the first device 11 (active device) by wired communication (step S207).

The second device 12 verifies whether the incoming data reception intervals have elapsed to match the preset determination intervals (step S208). In step S208, the second device 12 may verify whether the coupling information reception intervals have elapsed to match the preset determination intervals.

If the incoming data reception intervals have not elapsed to match the preset determination intervals ("NO" at step S208), the second device 12 returns to step S207. If the incoming data reception intervals have elapsed to match the preset determination intervals ("YES" at step S208), the second device 12 returns to step S201.

If the received normal operation notification is not transmitted from the active device ("NO" at step S204), the second device 12 waits for a normal operation notification to be issued from a device other than the active device by wired communication (step S209).

The second device 12 verifies whether the reception intervals of the normal operation notification issued from a device other than the active device by wired communication have elapsed to match the preset determination intervals (step S210).

If the reception intervals of the normal operation notification issued from a device other than the active device by wired communication have not elapsed to match the preset determination intervals ("NO" at step S210), the second device 12 repeats step S210.

If the reception intervals of the normal operation notification issued from a device other than the active device by wired communication have elapsed to match the preset determination intervals ("YES" at step S210), the second device 12 returns to step S201.

Figure 10:
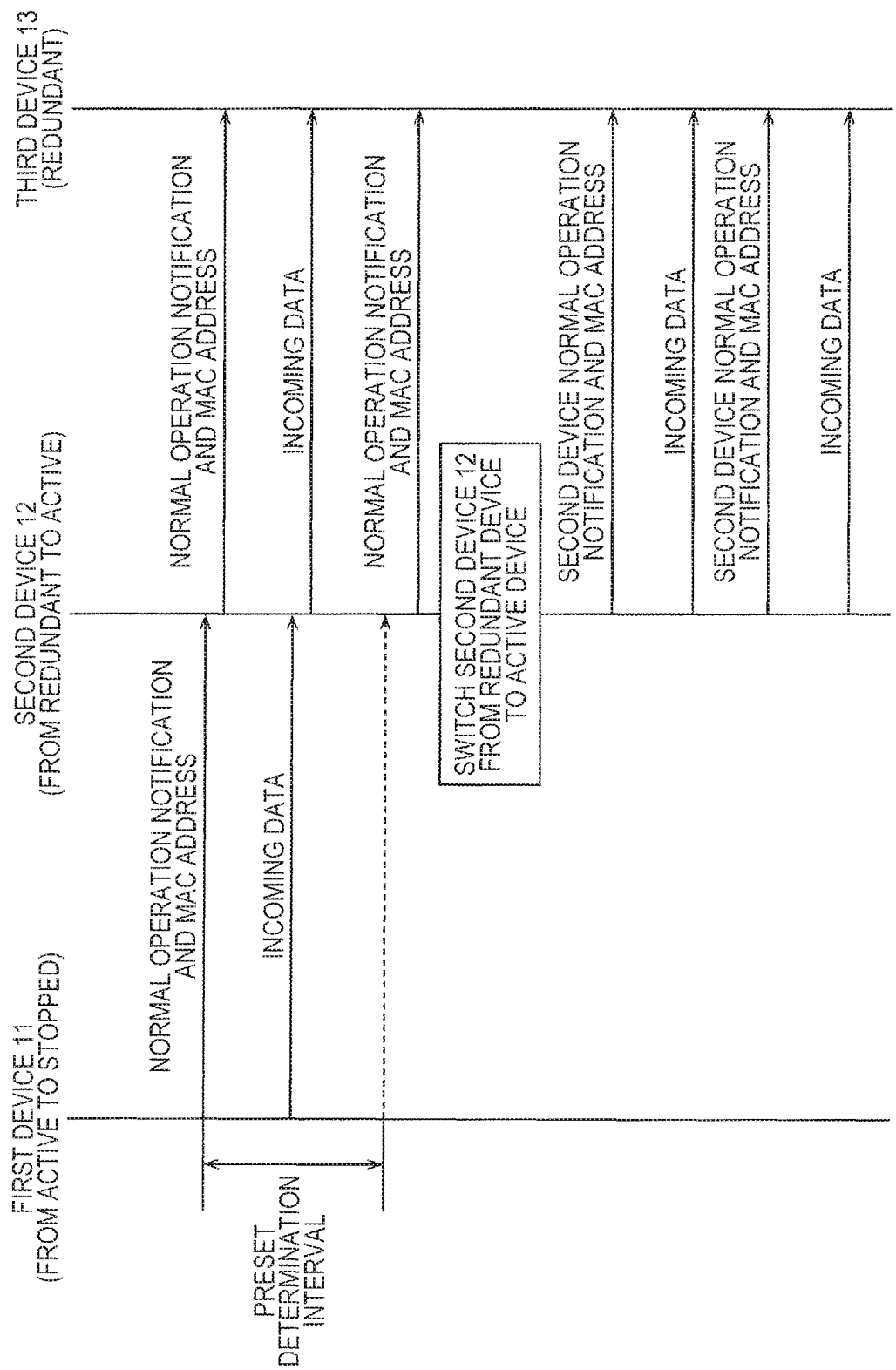
FIG. 10 is a sequence diagram illustrating the operations of the wireless communication apparatus according to the first embodiment.

FIG. 10 is a sequence diagram illustrating the operations of the wireless communication apparatus according to the first embodiment. The sequence diagram of FIG. 10 relates to abnormal operations.

As illustrated in FIG. 10, the second device 12 (redundant device) receives the normal operation notification and the MAC address from the first device (active device) at the preset determination intervals. The second device 12 then transmits the normal operation notification and MAC address received from the first device to the third device 13 (redundant device) at the preset determination intervals. The second device 12 may transmit the normal operation notification and MAC address received from the first device to a device (redundant device) other than the third device at the preset determination intervals.

If the second device 12 fails to receive the normal operation notification and the MAC address from the first device 11 even after the elapse of the preset determination intervals, the wireless communication apparatus 10 switches the second device 12 from a redundant device to an active device.

Subsequently, the second device 12 transmits at the preset determination intervals to the third device 13 a MAC address and a second device normal operation notification indicating that the second device is operating normally.

The first embodiment has been described on the assumption that a tree wireless network is employed. However, the wireless network is not limited to a tree wireless network. The wireless communication apparatus according to the first embodiment may be applied to a mesh wireless network.

Second Embodiment

The storage section in a device, which includes a wireless transmission buffer and a wireless reception buffer, is linked to only a wireless interface when the device performs an independent operation instead of a redundant operation. That is to say, data transmitted through the wireless interface is stored in the wireless transmission buffer, and data received through the wireless interface is stored in the wireless reception buffer.

Meanwhile, in a redundant configuration according to the first embodiment, an active device and redundant devices are coupled through a wired interface, and the redundant devices need to have a storage area for copying the data and the coupling information. In view of such circumstances, a second embodiment of the present invention is configured so that the storage section in a device is linked to either or both of a wireless interface and a wired interface. Therefore, the coupling information can be copied without adversely affecting the operations of the device. Details are described below.

First of all, a case where the first device operates as an active device will be described.

Figure 11:
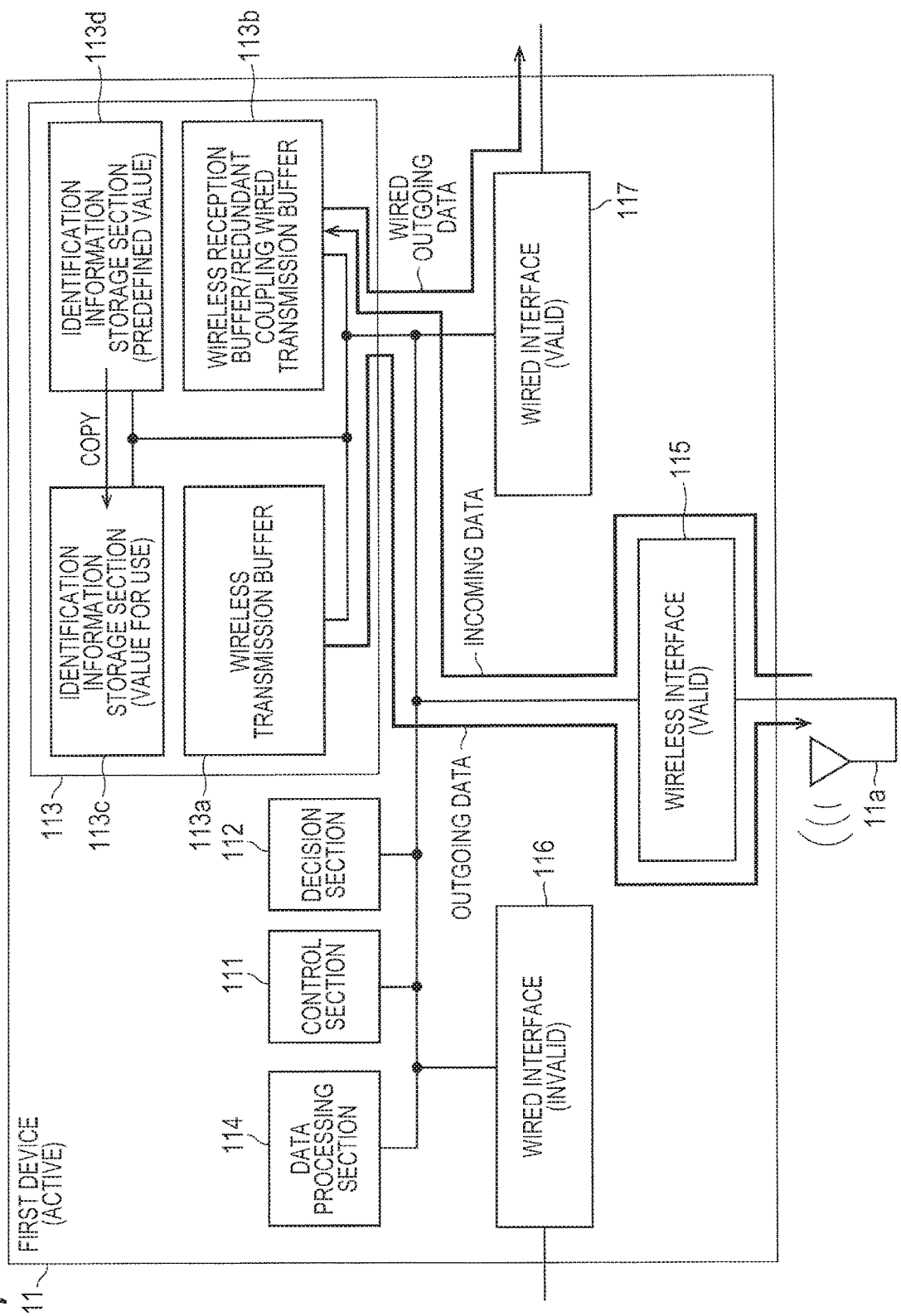
FIG. 11 is a block diagram illustrating a device according to a second embodiment of the present invention.

FIG. 11 is a block diagram illustrating a device according to the second embodiment. FIG. 11 illustrates the flows of outgoing data and incoming data in an active device coupled to a redundant device.

The wireless communication apparatus 10 includes a plurality of devices, which each include a wireless interface. As illustrated in FIG. 11, the first device 11, which is one of the devices, includes a wireless interface 115, a wired interface 116, and a wired interface 117. The wired interface 116 may be referred to as the wired input interface 116, and the wired interface 117 may be referred to as the wired output interface 117.

The storage section 113 in the first device 11 includes an identification information storage section 113c and an identification information storage section 113d. As the first device 11 operates as an active device, it is coupled not only to a redundant device but also to another wireless communication apparatus. Thus, the wireless interface 115 and the wired interface 117 become valid, and the wired interface 116 becomes invalid.

The first device 11 receives incoming data from another wireless communication apparatus. The received data is stored in the wireless reception buffer/redundant coupling wired transmission buffer 113b through the antenna 11a and the validated wireless interface 115. The wireless reception buffer/redundant coupling wired transmission buffer 113b operates as a buffer for storing incoming data transmitted from another wireless communication apparatus.

The received data is conveyed from the wireless reception buffer/redundant coupling wired transmission buffer 113b to another device through the validated wired interface 117. The wireless reception buffer/redundant coupling wired transmission buffer 113b also operates as a transmission buffer for conveying data to another device. The wireless reception buffer/redundant coupling wired transmission buffer 113b not only operates as a buffer for storing incoming data transmitted from another wireless communication apparatus, but also operates as a transmission buffer for conveying the incoming data to another device.

For use in communication, the first device 11 copies to the identification information storage section 113c a MAC address and other identification information that are stored in the identification information storage section 113d as predefined values.

The first device 11 transmits outgoing data stored in the wireless transmission buffer 113a to another wireless communication apparatus through the wireless interface 115 and the antenna 11a. In this instance, the transmission is performed by establishing communication based on the MAC address and other identification information copied to the identification information storage section 113c.

A case where the first device operates as a single active device will now be described.

Figure 12:
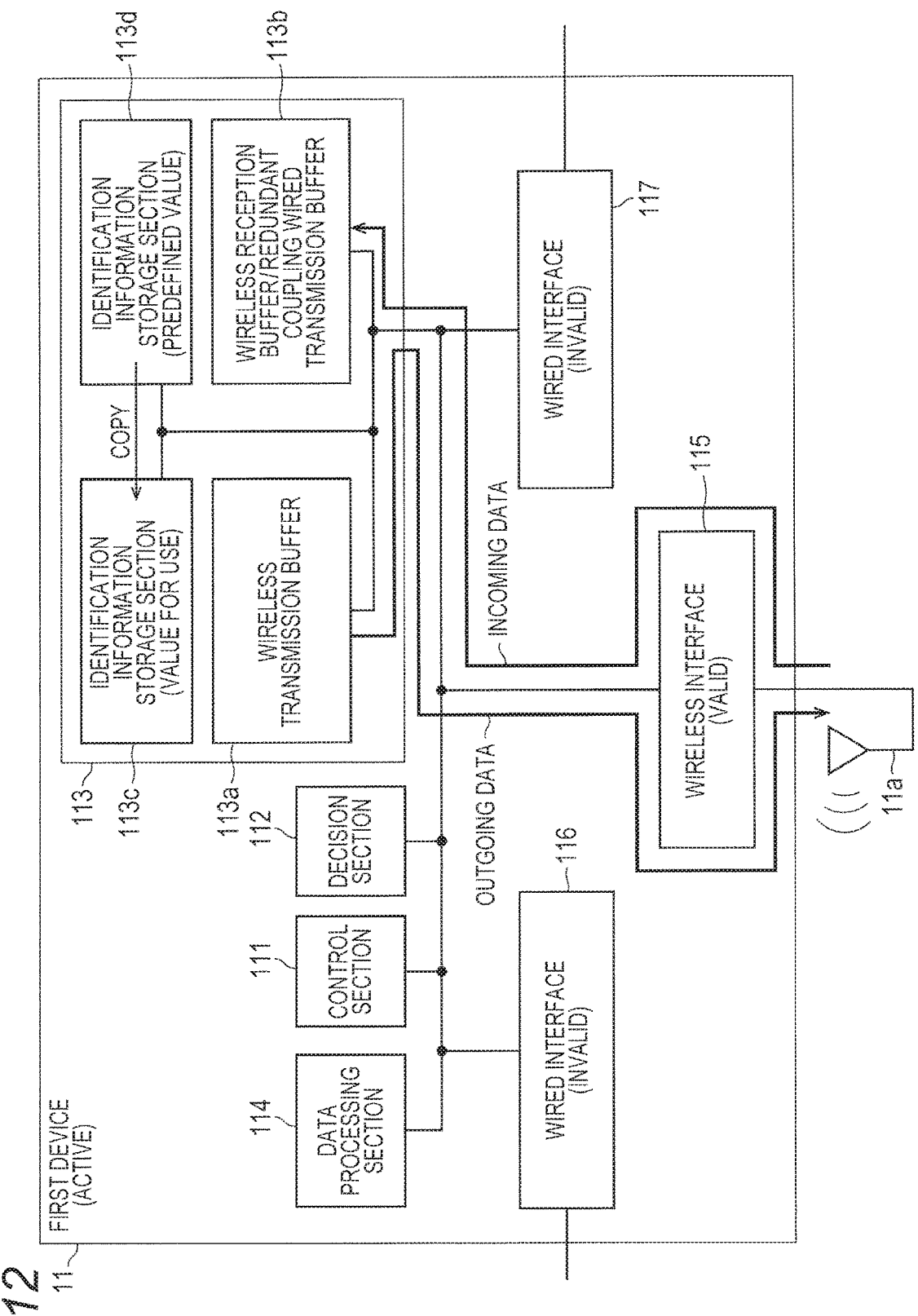
FIG. 12 is a block diagram illustrating a device according to the second embodiment.

FIG. 12 is a block diagram illustrating a device according to the second embodiment. FIG. 12 illustrates the flows of outgoing data and incoming data in a single active device that is not coupled to a redundant device.

As illustrated in FIG. 12, the first device 11, which operates as a single active device, is not coupled to a redundant device, but is coupled to another wireless communication apparatus. Thus, the wireless interface 115 becomes valid, and the wired interface 116 and the wired interface 117 become invalid. The wired interface 116 and the wired interface 117 become invalid because they do not need to convey, for example, the coupling information to another device.

In the above instance, the wireless reception buffer/redundant coupling wired transmission buffer 113b operates as a reception buffer for storing incoming data that is received from another wireless communication apparatus through the wireless interface 115.

A case where the first device operates as a redundant device will now be described.

Figure 13:
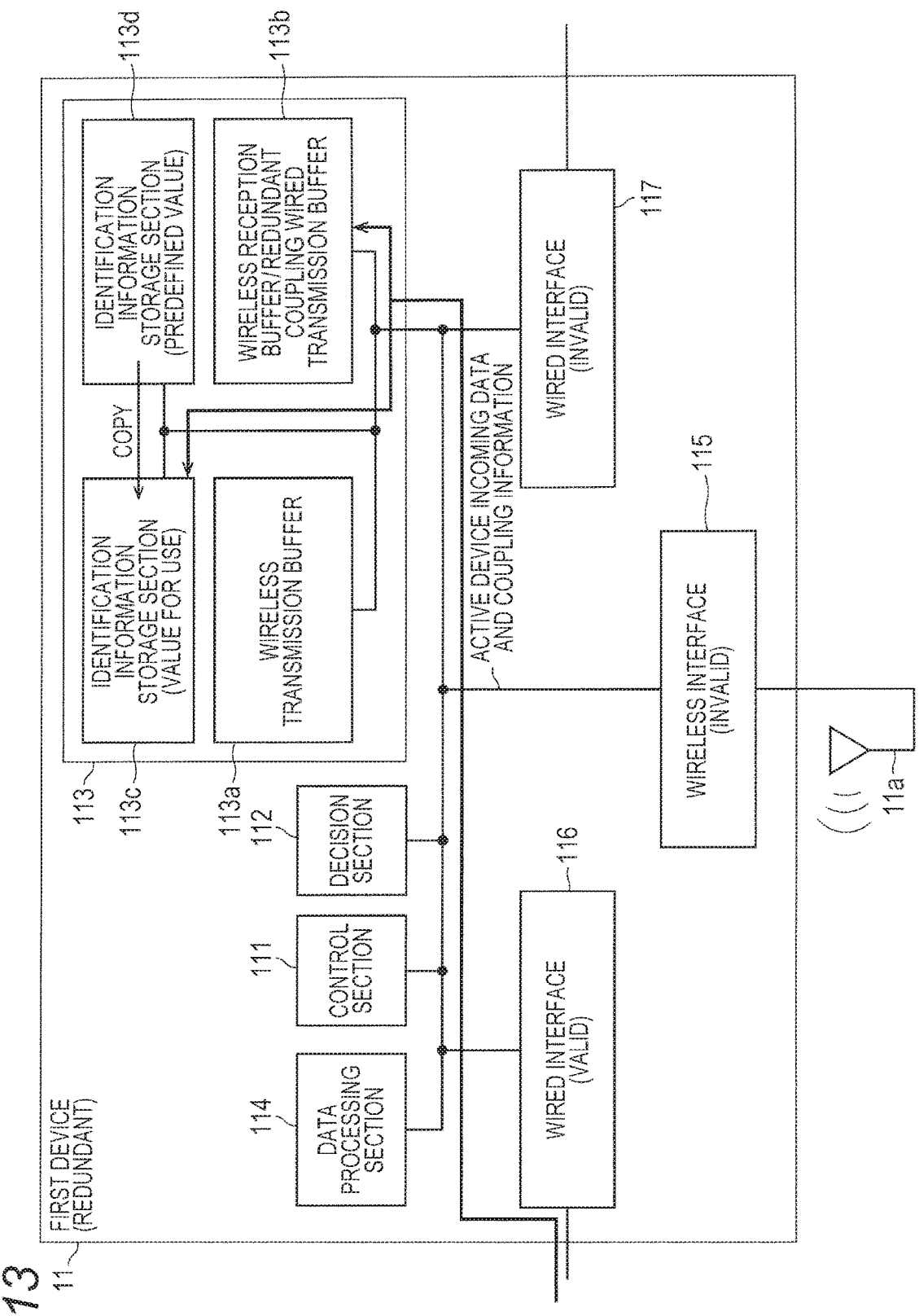
FIG. 13 is a block diagram illustrating a device according to the second embodiment of the present invention.

FIG. 13 is a block diagram illustrating a device according to the second embodiment. FIG. 13 illustrates the flows of outgoing data and incoming data in a redundant device that is coupled to an active device.

As illustrated in FIG. 13, the first device 11, which operates as a redundant device, is coupled to an active device, but is not coupled to another wireless communication apparatus. Thus, the wired interface 116 becomes valid, and the wireless interface 115 and the wired interface 117 become invalid.

In the above instance, the wireless reception buffer/redundant coupling wired transmission buffer 113b operates as a buffer for storing incoming data that is conveyed from an active device through the wired interface 116.

At a particular time point, the device operates as either an active device or a redundant device. Therefore, it is not necessary to separately provide a buffer for the operation of an active device and a buffer for the operation of a redundant buffer.

When the first device 11 operates an active device, the wireless interface 115 and the wired interface 117 become valid, and the wired interface 116 becomes invalid. When the first device 11 operates as a single active device, the wireless interface 115 becomes valid, and the wired interface 116 and the wired interface 117 become invalid. When the first device 11 operates a redundant device, the wired interface 116 becomes valid, and the wireless interface 115 and the wired interface 117 become invalid.

Whether the interfaces are valid or invalid depends on the operating status of the device. More specifically, the interfaces to be linked to the storage section vary depending on the operating status of the device. In the second embodiment, therefore, the transmission and reception buffers are linked to the individual interfaces in accordance with the operating status of the device and with the coupling status of a wired interface for coupling a redundant device. The transmission and reception buffers in the device are linked to either or both of a wireless interface and a wired interface.

The storage section in the device is linked to at least one of the wireless interface, the wired input interface, and the wired output interface depending on whether the device or another device is determined to be valid. The transmission and reception buffers may be referred to as the storage section.

If, for example, the first device 11 is determined to be valid, the storage section 113 in the first device 11 is linked to the wireless interface 115 of the first device 11 and to the wired output interface 117 of the first device 11. If the second device 12 is determined to be valid, the storage section 113 in the first device 11 is linked to the wired input interface 116 of the first device 11.

Meanwhile, if the first device 11 is determined to be valid, is not coupled to another redundant device, and is adapted to operate as a single active device, the storage section 113 in the first device 11 is linked to the wireless interface 115.

In the second embodiment, the transmission buffer or reception buffer of the device is linked not only to a wireless interface for an active device but also to a wired interface for coupling a redundant device.

Consequently, the linkage between the transmission and reception buffers and the communication interfaces can be changed in accordance with the operating status of a wired interface and with the coupling status of a redundant device. As a result, the coupling information about the device can be copied without affecting the operating status of the device.

An active device may be changed to a redundant device at an appropriate time point in order to control the operating load imposed on each device in the wireless communication apparatus.

Further, an active device may be changed to a redundant device at an appropriate time point in order, for example, to diagnose the soundness of an operation of each device.

While the present invention made by its inventors has been described in detail in terms of particular embodiments, the present invention is not limited to the foregoing embodiments. It is to be understood by those skilled in the art that various modifications can be made without departing from the spirit and scope of the present invention.

What is claimed is:

1. A wireless communication apparatus, comprising:
   a plurality of devices that transmit and receive data through a wireless network;
   wherein the devices each include a control circuit, a decision circuit, a wired interface, a wireless interface and a storage circuit;
   wherein the decision circuit in one of the devices designates a first device out of the devices as a first valid device, and designates a second device out of the devices as a second valid device;
   wherein the control circuit in the first device copies to the second device the data and coupling information for transmitting and receiving the data;
   wherein, when the second device is designated as the second valid device, the control circuit in the second device transmits the copied data from the second device,
   wherein, in the first device, the storage circuit is linked to the wireless interface or the wired interface depending on whether the first or the second device is designated as the first or the second valid device.

2. The wireless communication apparatus according to claim 1,
   wherein the devices each include a detection circuit that detects a received reception power level, and
   wherein, when the reception power level detected by the detection circuit in the first device is not higher than a predetermined level, the decision circuit, after having designated the first device and the second device, determines the second device as the second valid device.

3. The wireless communication apparatus according to claim 1,
   wherein each of the devices is set a priority;
   wherein, based on the priorities assigned to the devices, the decision circuit, after having designated the first device and the second device, determines a device having a highest priority as the first device and determines a device having a second highest priority as the second device.

4. The wireless communication apparatus according to claim 1,
   wherein the devices are coupled through the wired interfaces, and
   wherein the control circuit in the first device copies the data and the coupling information to the second device through the wired interface.

5. The wireless communication apparatus according to claim 4,
   wherein the wired interface includes one of a UART (Universal Asynchronous Receiver/Transmitter), a USART (Universal Synchronous/Asynchronous Receiver/Transmitter), a USB (Universal Serial Bus), an I2C (Inter-Integrated Circuit), an SPI (Serial Peripheral Interface), and Ethernet (registered trademark).

6. The wireless communication apparatus according to claim 4,
   wherein the devices are serially coupled through the wired interface or coupled in bus form through the wired interface.

7. The wireless communication apparatus according to claim 1,
   wherein the coupling information includes at least one of an identification number of the first device, a radio frequency used for transmitting and receiving the data, power for transmitting the data, a data rate, a modulation method, a spreading code, an identification number of a remote wireless communication apparatus engaged in the transmission and reception of the data, an encryption key, a session ID (Identification), a network ID, transmission/reception data, a transmission/reception time point, a routing destination, a sequence number, and a communication protocol type.

8. The wireless communication apparatus according to claim 7,
   wherein the identification number of the first device comprises a MAC (Media Access Control) address, an IP (Internet Protocol) address, or a number that is unique to the wireless communication apparatus and capable of identifying the wireless communication apparatus in the wireless network.

9. The wireless communication apparatus according to claim 7,
   wherein an identification number of the second device is the same as the identification number of the first device that is included in the coupling information.

10. The wireless communication apparatus according to claim 7,
    wherein the data is transmitted from the second device by using the same radio frequency as the radio frequency included in the coupling information.

11. The wireless communication apparatus according to claim 1,
    wherein the storage circuit stores the data and the coupling information.

12. The wireless communication apparatus according to claim 1,
   wherein the devices each further include an antenna that transmits and receives the data.

13. The wireless communication apparatus according to claim 1,
   wherein the wired interface includes a wired input interface and a wired output interface, and
   wherein, in the first device, the storage circuit is linked to at least one of the wireless interface, the wired input interface or the wired output interface depending on whether the first or the second device is designated as the first or the second valid device.

* * * * *